(12) United States Patent
Belloso

(10) Patent No.: US 6,824,098 B1
(45) Date of Patent: Nov. 30, 2004

(54) VTOL PARAFOIL AIRCRAFT

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 114 days.

(21) Appl. No.: 10/445,557

(22) Filed: May 28, 2003

(51) Int. Cl.$^7$ .................................................. B64B 1/20
(52) U.S. Cl. ........................... 244/25; 244/29; 244/145; 244/902
(58) Field of Search ............................. 244/25, 29, 13, 244/36, 900, 902, 145

(56) References Cited

U.S. PATENT DOCUMENTS

| | | | | |
|---|---|---|---|---|
| 2,616,509 A | * | 11/1952 | Thomas ........................ | 416/84 |
| 3,796,398 A | * | 3/1974 | Eilertson ..................... | 244/139 |
| 4,102,519 A | * | 7/1978 | Crosby, Jr. ................... | 244/125 |
| 4,261,534 A | * | 4/1981 | Roselli ........................ | 244/22 |
| 4,424,945 A | * | 1/1984 | Dell ............................ | 244/13 |
| 4,634,080 A | * | 1/1987 | McNally ..................... | 244/13 |
| 4,708,078 A | * | 11/1987 | Legaignoux et al. .. | 114/102.23 |
| 5,005,783 A | * | 4/1991 | Taylor ......................... | 244/97 |
| 5,080,694 A | | 1/1992 | Knoblauch et al. | |
| 5,090,637 A | | 2/1992 | Haunschild | |
| 5,368,067 A | | 11/1994 | Cook, Jr. | |
| 5,620,153 A | | 4/1997 | Ginsberg | |
| 6,196,498 B1 | * | 3/2001 | Eichstedt et al. .............. | 244/5 |

* cited by examiner

Primary Examiner—Michael J. Carone
Assistant Examiner—Gabriel Sukman
(74) Attorney, Agent, or Firm—Norman B. Rainer

(57) ABSTRACT

An aircraft is provided having an inflatable parafoil canopy wing and a suspended fuselage. The wing is constructed such that, when inflated, it has an airfoil configuration having leading and trailing edges, thereby producing lift by interaction with air encountered by the leading edge. A central compartment confines a buoyant gas which causes the total volume of the wing to be varied in response to the degree of inflation with the buoyant gas. With sufficient inflation, the aircraft is capable of vertical take-off and landing (VTOL).

14 Claims, 8 Drawing Sheets

VTOL PARAFOIL AIRCRAFT

BACKGROUND OF THE INVENTION

1. Field of the Invention

This invention relates to parafoil aircraft, and more particularly concerns parafoil aircraft having a parafoil canopy that is inflated with lighter-than-air gas to a degree that provides vertical takeoff and landing (VTOL) capability.

2. Description of the Prior Art

A parafoil is a flexible structure made of lightweight fabric or similar material having a shape similar to an airplane wing or airfoil.

Aircraft using parafoils to generate lift are well known. Inflatable parafoils are also known. U.S. Pat. Nos. 4,934,630; 4,860,970; 4,557,439 and 4,424,945 describe parafoils that are inflated during flight by air rammed into apertures generally located at the leading edge of the parafoil. They do not use lighter-than-air gas for inflation, and they do not have VTOL capability.

U.S. Pat. No. 5,620,153 describes a parafoil canopy which is inflated with buoyant gas such as heated air or helium so as to provide at least partial lift. It does not describe a VTOL aircraft.

U.S. Pat. No. 5,005,783 describes a variable geometry airship that is essentially a dirigible balloon equipped with retractable inflatable wings so that it can also be flown like an airplane.

U.S. Pat. No. 5,090,637 discloses a helium purification system for lighter-than-air aircraft aimed mainly at removing oxygen and nitrogen when mixed with the helium in the aerostat to improve lift. The catalytic system described generates heat as a by-product which generates additional lift by heating the lift gas. It does not describe controlled variation of the displacement volume of the aircraft itself as a means for controlling lift, nor does it describe a parafoil aircraft in general or a VTOL parafoil aircraft in particular.

It may be seen that the prior art does not describe a VTOL parafoil aircraft wherein buoyancy is controlled by varying the outer envelope volume of the parafoil by use of a lighter-than-air inflating gas. A further drawback of current parafoil wings is that as horizontal speed increases, the parafoil canopy will lag further and further behind the suspended passenger module, and tends to function more as a drag chute than an airfoil wing. Like a drag chute, present parafoils tend to develop a downwardly directed concavity in their undersurface during flight. Such concavity entraps air and causes considerable drag.

It is accordingly a primary object of this invention to provide a parafoil aircraft with VTOL and hovering capability.

Another object of the present invention is to provide a parafoil wing capable of maintaining a streamlined shape and smooth surface with low drag and high aerodynamic efficiency suitable for cruising at higher speeds.

A further object of this invention is to provide a VTOL aircraft that can be manufactured easily and inexpensively and can be operated simply, safely and economically.

These objects and other objects and advantages of the invention will be apparent from the following description.

SUMMARY OF THE INVENTION

The above and other beneficial objects and advantages are accomplished in accordance with the present invention by an aircraft comprising a parafoil wing which, when fully inflated with buoyant gas, will generate sufficient lift to permit vertical takeoff, and when partially deflated will enable the aircraft to hover or make a slow and controlled vertical descent and landing.

The buoyant gas is deployed in three sets of independently inflatable compartments, namely, an upper compartment disposed on the entire upper surface of the parafoil, a lower compartment disposed on the entire lower surface, and a control, third variably inflatable compartment between the two. The upper and lower compartments are kept constantly tautly inflated so as to present a smooth external surface to the parafoil and give it a more defined and less deformable airfoil shape.

Chordwise stiffening ribs are placed at regular intervals from the leading edge to the trailing edge to prevent or diminish concave deformity of the undersurface, thereby diminishing drag and improving lift.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
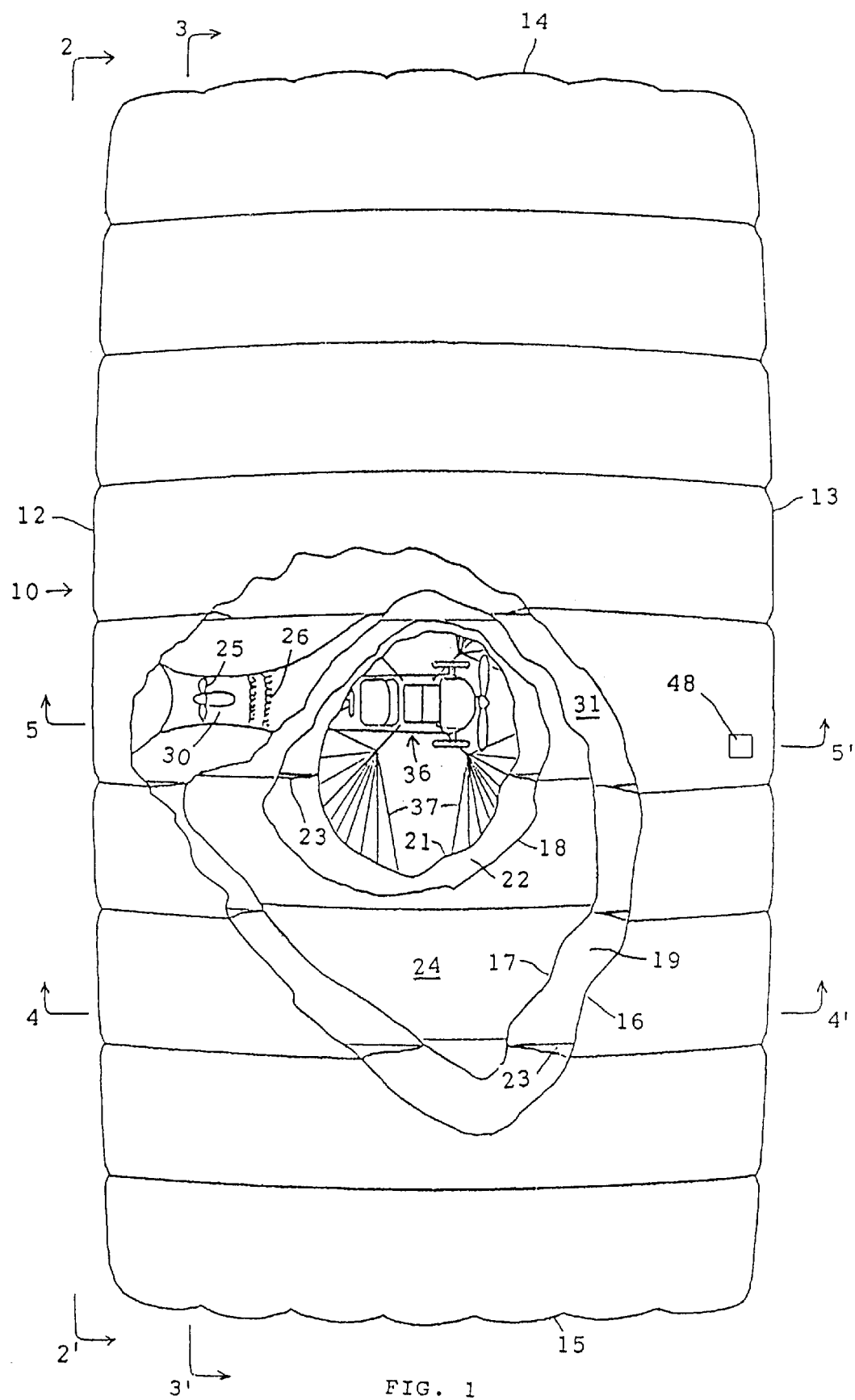
FIG. 1 is a top view of an embodiment of the aircraft of the present invention, with portions broken away to reveal interior details.
Figure 2:
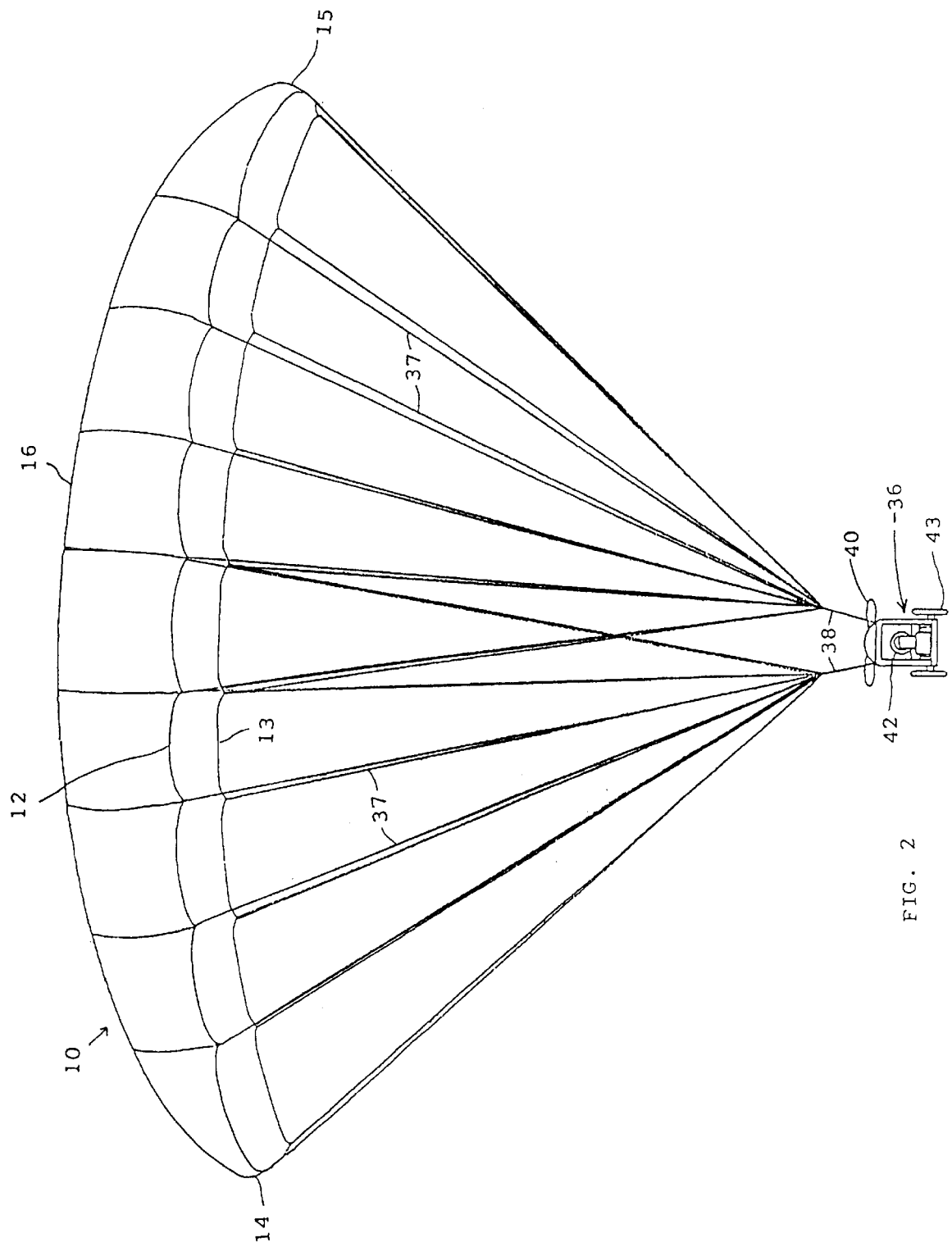
FIG. 2 is a front view along line 2–2' of FIG. 1.
Figure 3:
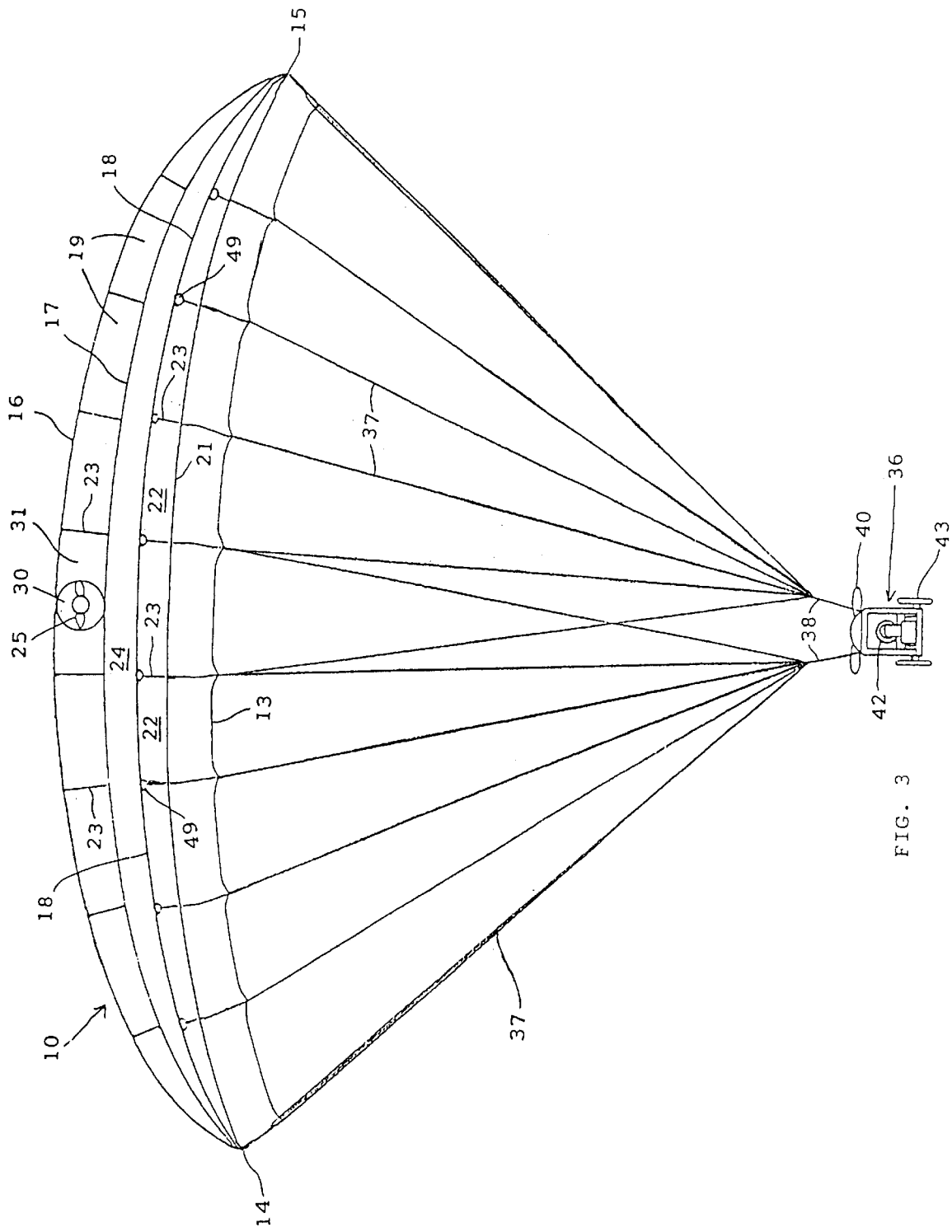
FIG. 3 is a sectional view taken in the direction of the arrows along line 3–3' of FIG. 1.
Figure 4:
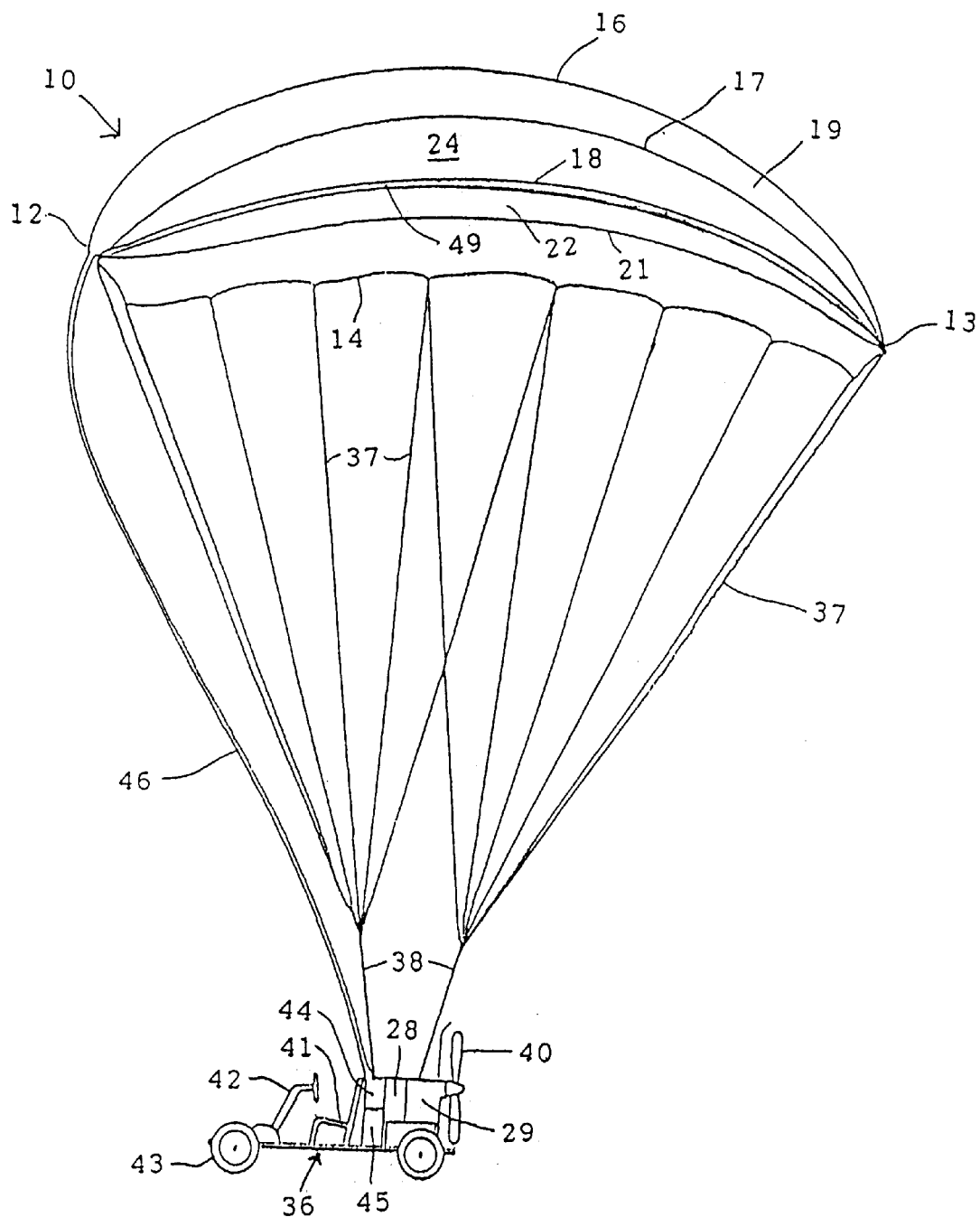
FIG. 4 is a sectional view along line 4–4' of FIG. 1.

Referring now to FIGS. 1-8, an aircraft 51 of the present invention is shown comprised of fuselage 36 suspended below an inflatable parafoil 10. Said fuselage has a passenger seat or module 41, an engine 29, gas handling components, and control features.

Said parafoil, fabricated of strong, lightweight airtight material, has a leading edge 12, trailing edge 13, right edge 14, left edge 15, upper layer 16, lower layer 21, upper intermediate layer 17, and lower intermediate layer 18. Upper layer 16 and upper intermediate layer 17 enclose upper lift compartment 19, designed to be inflated with lighter-than-air gas such as helium. Compartment 19 is configured such that, when inflated, it causes upper layer 16 to constitute the upper surface of the airfoil.

Lower intermediate layer 18 and lower layer 21 enclose lift compartment 22 designed to be inflated with lighter-than-air gas such as helium, and are configured so that, when fully inflated, lower layer 21 constitutes the lower surface of the airfoil. To achieve the desired structural shape and rigidity, lift compartments 19 and 22 are divided by partitions 23 into an array of parallel individual chambers 31 extending longitudinally between said leading and trailing edges. This rigidity is augmented by stiffening ribs 49 integrated into the structure of partitions 23. The front and rear ends of stiffening ribs 49 are preferably secured to front and rear shroud lines 37.

Upper intermediate layer 17 and lower intermediate layer 18 enclose central compartment 24 which is likewise designed to be filled with lighter-than-air gas. Means are provided for heating and cooling the gas in central compartment 24. The gas expands when it is heated, thereby increasing the volume of compartment 24, and increasing the total displacement volume of the parafoil 10. This results in increased buoyancy and lift. When the gas is cooled, it contracts, thereby reducing the volume of compartment 24 and decreasing the total displacement volume of the parafoil 10, resulting in decreased buoyancy and lift.

Various means can be used to heat and cool the lift gas. For example, the gas could be ducted past the hot external surfaces of the exhaust manifold, cylinders and cylinder heads of the engine, and ducted back to the parafoil, thus utilizing heat that would otherwise be wasted.

The embodiment illustrated in the accompanying drawings uses an electric heater 30 with a ducted fan 25 and heating elements 26 disposed within the parafoil 10 itself as shown in FIGS. 1, 3, 5, 6, 7 and 8. The ducted fan 25 is powered by electric generator 28 coupled to engine 29, and may be switched on or off by the operator at will. The heating elements 26 can be turned on only when the fan 25 is running, for safety purposes.

The embodiment uses the most medially located chamber 31 of upper lift compartment 19 to house the heater 30. Chamber 31 opens to central compartment 24 near both leading and trailing edge to permit free circulation of the lift gas between chamber 31 and compartment 24, especially when ducted fan 25 is in operation.

Figure 5:
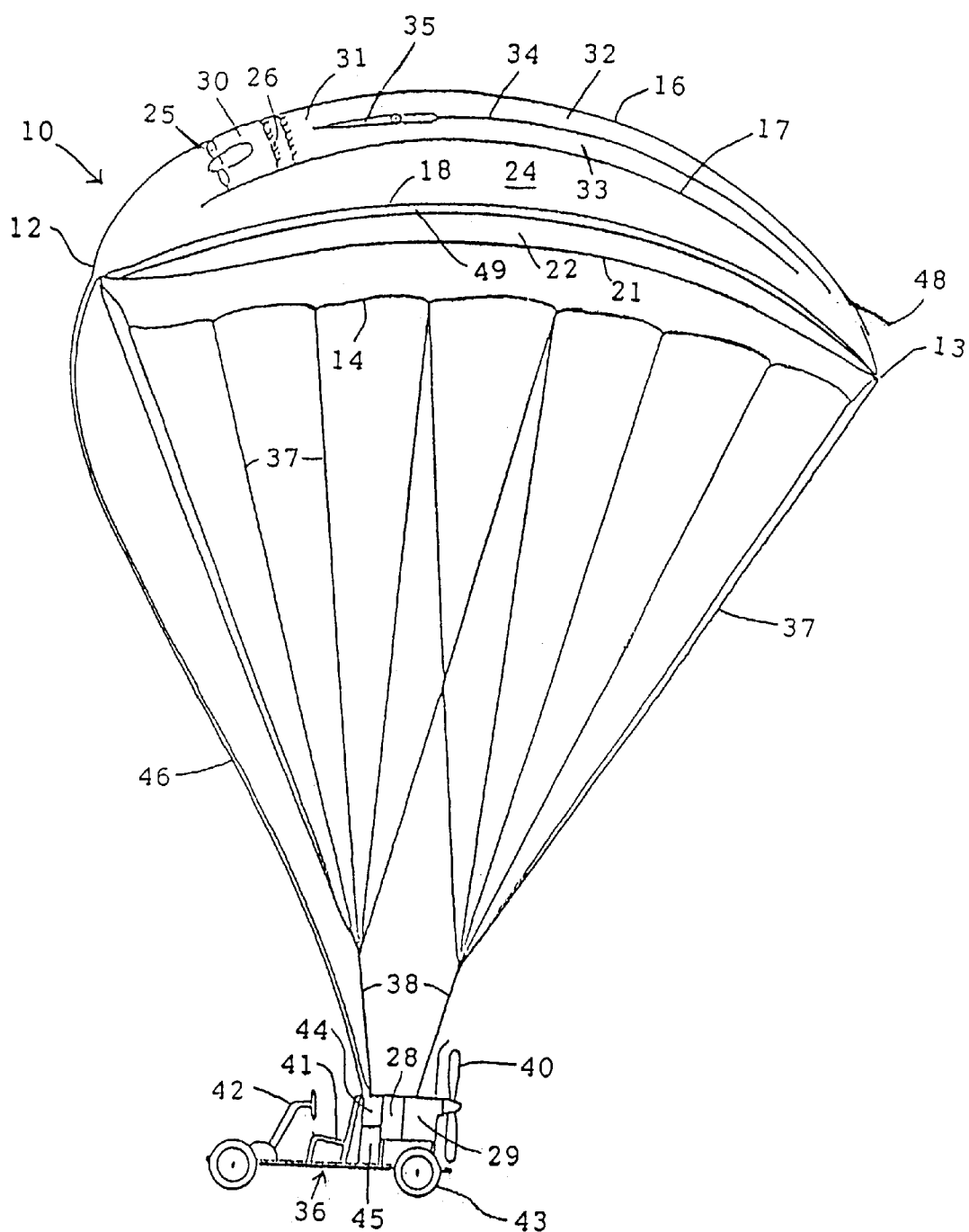
FIG. 5 is a sectional view along line 5–5' of FIG. 1.
Figure 6:
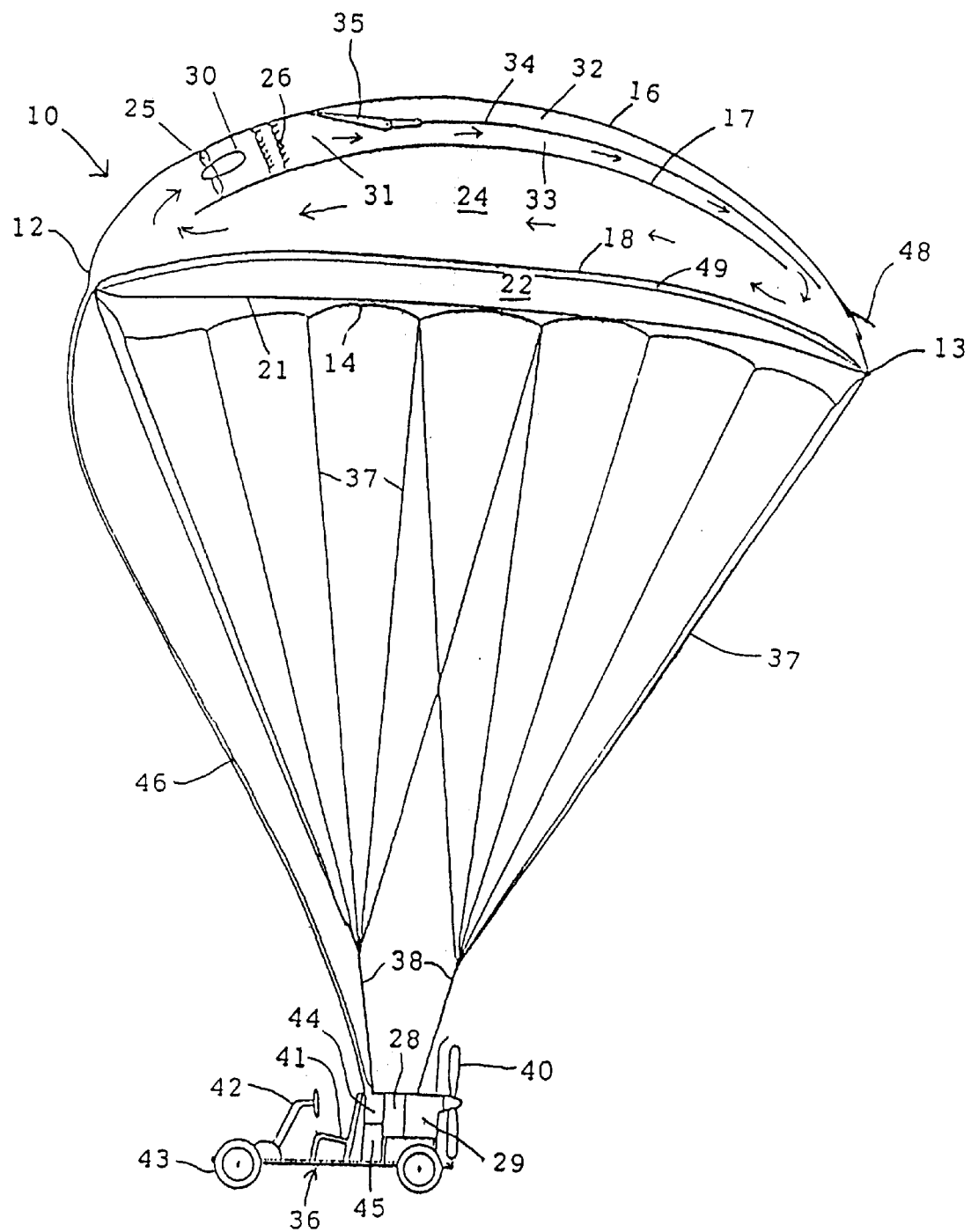
FIG. 6 is a view similar to FIG. 5 showing the aircraft during vertical ascent.
Figure 7:
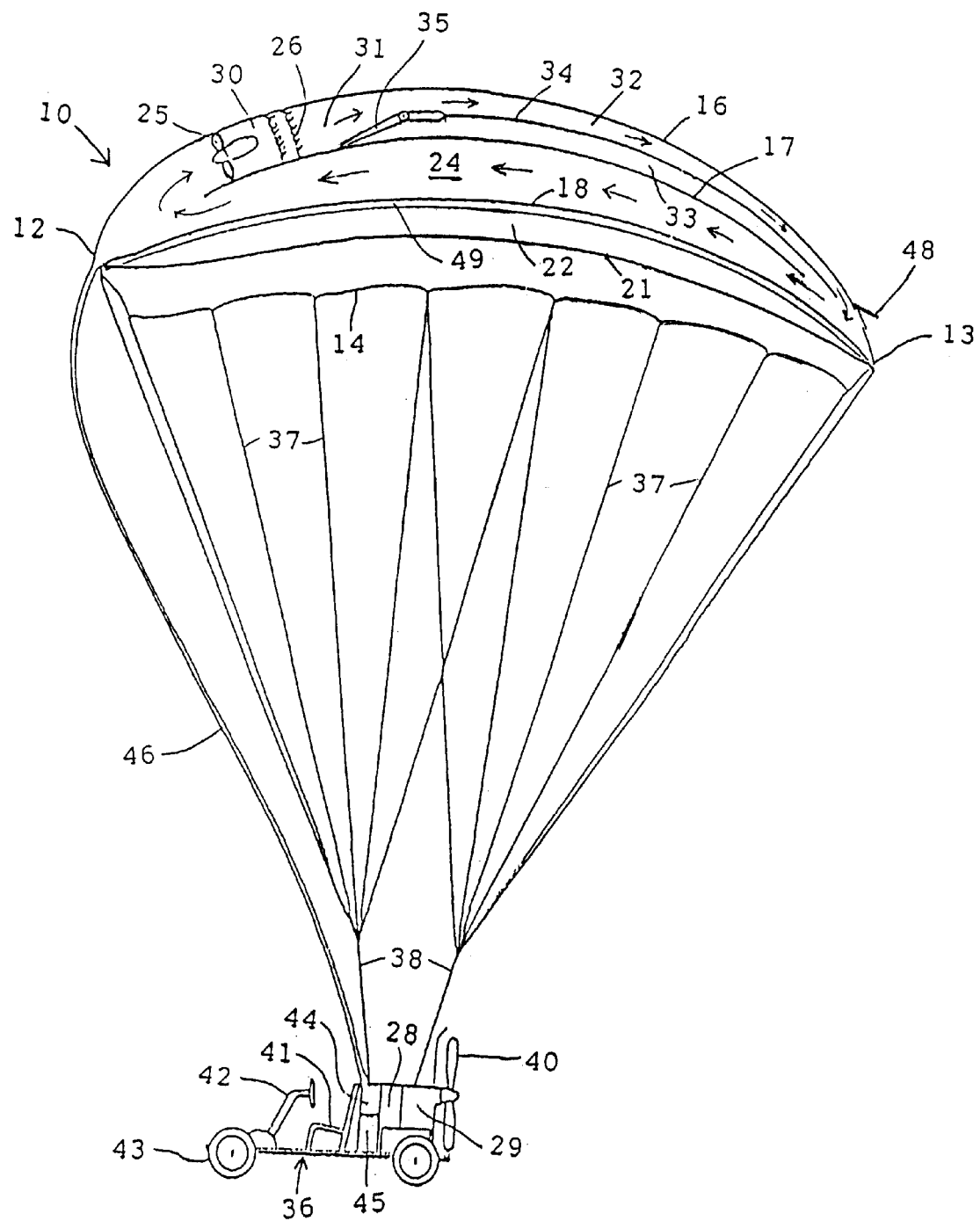
FIG. 7 is a view similar to FIG. 5 showing the aircraft during vertical descent.
Figure 8:
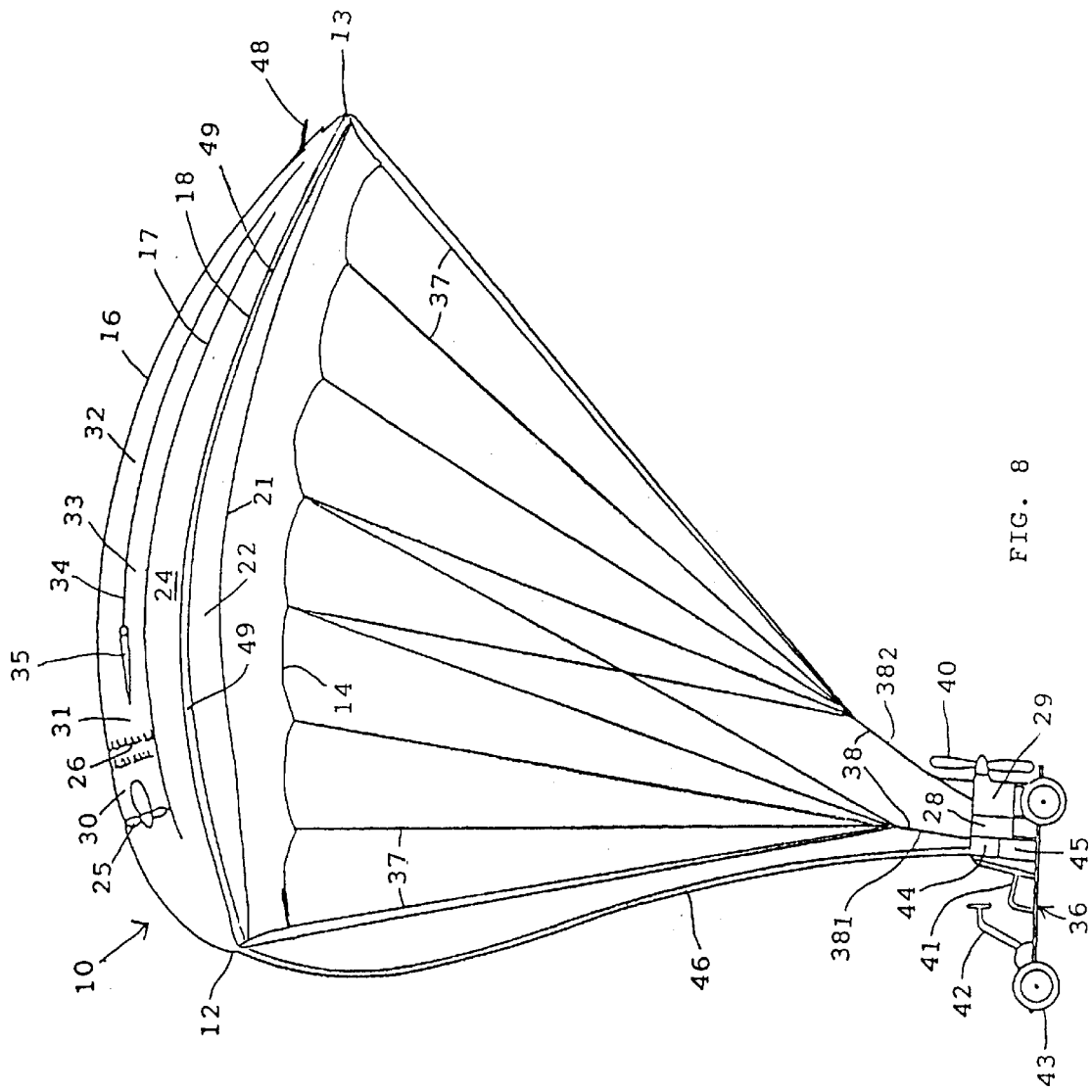
FIG. 8 is a view similar to FIG. 5 showing the aircraft during forward flight.

To the rear of heater 30, chamber 31 is further divided into upper gas passage 32 and lower gas passage 33 by a horizontal partition 34 at whose front edge is disposed a two-way valve 35. Said valve can be swiveled upward to shut off upper gas passage 32, as shown in FIG. 6, or downward to shut off lower gas passage 33, as shown in FIG. 7, or adjusted to a half-way position to keep both passages 32 and 33 open, as shown in FIGS. 5 and 8.

The fuselage 36 is suspended beneath the parafoil 10 by shroud lines 37, and risers 38. Disposed on the fuselage 36 are an engine 29 with propeller 40, a pilot's seat 41, aircraft type steering assembly 42 and landing wheels 43. Coupled to the engine 29 are an electric generator 28 and a gas compressor 44 with associated lift gas storage tank 45 and gas line 46 for transferring gas from the storage tank 45 to the parafoil 10 and from the parafoil 10 to the storage tank 45 after being compressed by compressor 44.

To operate the aircraft, upper and lower compartments 19 and 22, respectively, are fully inflated with a suitable lift gas, such as helium. Lift gas storage tank 45 is filled with compressed lift gas, and central compartment 24 is inflated until the aircraft attains near neutral buoyancy, preferably making allowances for the loss of the weight of fuel as the fuel is being consumed by said engine during the operation of the aircraft.

To take off vertically, gas heater fan 25 and heating element 26 are turned on. Two-way valve 35 is swiveled to the upward position and lift gas is then heated and circulated into central compartment 24 as shown by the arrows in FIG. 6. The expanding heated gas increases the volume of compartment 24 until the buoyancy of parafoil 10 exceeds the weight of the aircraft to the point where vertical take off is attained. Additional buoyancy can also be gained by releasing helium lift gas from storage tank 45 through gas line 46 into central compartment 24 for added displacement volume.

When the desired altitude is reached, the propeller 40 is engaged for horizontal flight. As forward speed increases, the aircraft gains increased aerodynamic lift. It will then be possible, if desired, to partially deflate central compartment 24 and still maintain flight altitude through a combination of aerodynamic lift and buoyant lift. This may be particularly advantageous because it avoids any unwanted increase in altitude and may reduce drag by making the airfoil 10 less bulky and more streamlined in shape. Such status prepares the aircraft for landing procedures. Additional measures can be made to reduce drag during horizontal flight, namely shortening the front risers 381 and lengthening the rear risers 382. Such expedient, as shown in FIG. 8, has the effect of reducing the parafoil's angle of attack, thus reducing aerodynamic drag. Stiffening ribs 49 associated with partitions 23 serve to reduce the formation of a deep concavity in the undersurface of the parafoil 10, reducing the entrapment of air therein and thereby reducing drag.

To hover in the air, the operator adjusts the aircraft buoyancy to neutral, using thermal buoyancy control or lift gas augmentation or compression (and storage) as needed, or through a combination of both methods. Once neutral buoyancy is attained, the aircraft can be stopped safely in mid-air without undue loss of altitude.

To land vertically, the operator gradually deflates the volume of compartment 24 by either of three methods or any combination thereof. In a first deflation method, if the temperature of the lift gas in compartment 24 is higher than that of the outside atmosphere, the operator may elect to reduce the volume of compartment 24 by cooling the lift gas. This is done by switching off heating element 26 but keeping the fan 25 running. Two-way valve 35 is placed in low position so as to make the lift gas flow through upper gas passage 32. The upper wall of gas passage 32 is made of heat conductive material so that, when the lift gas passes through passage 32, heat is conducted to the outside atmosphere through said upper wall, thereby cooling the lift gas. Valves 35 and 48 are operated electrically via electrical conductors that penetrate layers of the parafoil in an airtight manner.

Another method for deflating compartment 24 is by drawing lift gas from chamber 24 through gas line 46 into gas compressor 44, where it is compressed and placed into the storage tank 45. The volume of compartment 24 is thus reduced.

In an emergency, if the aforesaid deflation methods fail, helium can be vented out into the atmosphere through emergency vent 48 to achieve a safe vertical landing. However, the resultant loss of helium makes this method too uneconomical for routine use.

In an alternative embodiment of the aircraft of the present invention, the parafoil 10 is made so that the combined volumes of upper and lower lift compartments 19 and 22, respectively, are sufficiently large so that when these compartments are fully inflated with lift gas such as helium, the parafoil aircraft attains near neutral buoyancy. Inflation and deflation of central compartment 24 will then be mainly used to control ascent or descent of the vehicle. This opens up various choices. For instance, less expensive lift gas such as hydrogen from a tank can be piped up through gas line 46 to inflate central compartment 24 as needed for ascent, and then simply vented out through vent 48 as needed for descent. This eliminates the need for an on-board compressor.

A further embodiment of the aircraft would use air to inflate compartment 24. The air can be heated to expand it and make it lighter than the surrounding atmosphere for ascent, and cooled or vented out as needed for descent. This also eliminates the need for an on-board compressor.

The reason for using upper and lower arrays of lift chambers, separate from central compartment 24, is to ensure that the outer surface of parafoil 10 can be made smooth and taut at all times regardless of the degree of inflation or deflation of central compartment 24. This makes it possible for parafoil 10 to present an aerodynamically streamlined interface with the surrounding atmosphere and to maintain its airfoil shape when the aircraft is in flight even when central compartment 24 is being deflated. Otherwise, dimpling and deformity of the parafoil may occur, with attendant increased drag and loss of aerodynamic efficiency.

Steering of the aircraft in forward flight is accomplished in a manner similar to that employed with other parafoil aircraft. In general, the pilot achieves a right turn by shifting his weight to the right, and similarly turns left by shifting his weight to the left. Climbing may be achieved by increasing propeller speed, and descent may be achieved by diminishing propeller speed.

In the specific embodiment illustrated in the drawings, the fuselage 36 is suspended to the parafoil 10 by risers 38 which are connected to the shroud lines 37. The risers 38 are four in number, the right front riser, the left front riser, the right rear riser, and the left rear riser, each connected to the corresponding shroud lines 37. To shift the weight to the right, the pilot pulls down on the right front and right rear risers. To shift such weight to the left, the pilot pulls down on the left front and left rear risers. To increase the angle of attack of the parafoil, the pilot pulls down on the rear risers (both left and right), and to decrease the angle of attack he pulls down on both front risers. Pulling down on the risers is facilitated by powered winches, preferably coupled to an aircraft type steering wheel. Turning of the wheel to the right pulls down the right side risers, turning the wheel to the left pulls down the left side risers, pushing forward on the wheel pulls down the front risers, and pulling back on the wheel pulls down on the rear risers, so that piloting this aircraft will be somewhat similar to piloting other aircraft. Alternatively, a joystick may be used instead of a steering wheel.

The exemplified embodiment of aircraft of this invention is capable of flying into headwinds of 50 to 90 miles per hour. It can handle sidewinds of similar magnitude by partially heading into the wind, as other aircraft do. However, like other parafoil aircraft, it is intended for use only in fair weather with light breezes, and mostly for recreational flying. It is, however, useful in traveling to otherwise inaccessible places.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An aircraft comprising an inflatable parafoil wing of gas-impervious compliant material bounded by upper and lower surfaces and leading and trailing edge extremities, and a fuselage suspended beneath said wing, said wing, when inflated with a buoyant gas, expanding in volume to generate sufficient lift to permit vertical ascent of said aircraft, and having an airfoil shape that interacts with an airstream directed against said leading extremity to produce aerodynamic lift, said fuselage comprising pilot accommodating means, an engine, propulsion means driven by said engine, means for transferring buoyant gas between said fuselage and wing, means for compressing said buoyant gas and storing it for re-use, steering controls, and means for engaging a landing surface.

2. An aircraft comprising an inflatable parafoil wing of gas-impervious compliant material bounded by upper and lower surfaces and leading and trailing extremities, and a fuselage suspended beneath said wing, said wing comprised of upper, central and lower compartments, said central compartment adapted to hold a variable amount of a buoyant gas, thereby providing controlled variation of the volume of said wing which, when fully inflated generates sufficient lift to permit vertical ascent of said aircraft, said upper and lower compartments adapted to become inflated with air during flight to taut conditions which establish the shapes of said upper and lower surfaces as being smoothly upwardly convex, said upper surface having a greater degree of convex curvature than said lower surface, thereby creating an airfoil shape that interacts with an airstream directed against said leading extremity to produce aerodynamic lift, said fuselage comprising pilot accommodating means, an engine, propulsion means driven by said engine, means for transferring buoyant gas between said fuselage and wing, steering controls, and means for engaging a landing surface.

3. The aircraft of claim 2 wherein said buoyant gas is selected from the group consisting of helium, hydrogen and heated air.

4. The aircraft of claim 2 wherein said upper and lower compartments are divided by partitions into an array of parallel individual chambers extending between said leading and trailing edges.

5. The aircraft of claim 4 wherein stiffening ribs are associated with said partitions, serving to stabilize the configuration of said wing.

6. The aircraft of claim 2 wherein said wing is further comprised of left and right edge extremities which span said leading and trailing edges in substantially orthogonal relationship therewith.

7. The aircraft of claim 4 wherein said partition walls are comprised of said compliant material.

8. The aircraft of claim 2 wherein said fuselage is further provided with an electrical generator, operated by said engine.

9. The aircraft of claim 8 wherein heating means is interactive with said central compartment for heating the gas confined therein, said heating increasing the buoyancy of said wing.

10. The aircraft of claim 9 wherein said heating means is an electrical heater activated by said generator.

11. The aircraft of claim 9 wherein said heating means distributes a stream of gas which has been heated by contact with hot surfaces of said engine.

12. The aircraft of claim 9 wherein a centrally located chamber of said upper array of chambers communicates with said central compartment.

13. The aircraft of claim 12 wherein said heating means is located within said centrally located chamber.

14. The aircraft of claim 13 wherein a deflector valve is associated with said heating means to route heated air to said central compartment.

* * * * *